W. CUNLIFFE.
SPINNING MACHINE.
APPLICATION FILED AUG. 19, 1913.

1,233,988.

Patented July 17, 1917.
9 SHEETS—SHEET 7.

Inventor
Wilfred Cunliffe

Witnesses
James Crown
M. E. Laughlin

By Victor J. Evans
Attorney

W. CUNLIFFE.
SPINNING MACHINE.
APPLICATION FILED AUG. 19, 1913.

1,233,988.

Patented July 17, 1917.
9 SHEETS—SHEET 8.

Inventor
Wilfred Cunliffe,
By Victor J. Evans
Attorney

Witnesses

W. CUNLIFFE.
SPINNING MACHINE.
APPLICATION FILED AUG. 19, 1913.

1,233,988.

Patented July 17, 1917.
9 SHEETS—SHEET 9.

Witnesses
C. James Cronin
M. L. Laughlin

Inventor
Wilfred Cunliffe,
By Victor J. Evans
Attorney

UNITED STATES PATENT OFFICE.

WILFRED CUNLIFFE, OF STAMFORD, CONNECTICUT, ASSIGNOR TO MIANUS MANUFACTURING COMPANY, INC., OF GREENWICH, CONNECTICUT, A CORPORATION OF CONNECTICUT.

SPINNING-MACHINE.

1,233,988.      Specification of Letters Patent.      Patented July 17, 1917.

Application filed August 19, 1913. Serial No. 785,574.

*To all whom it may concern:*

Be it known that I, WILFRED CUNLIFFE, a citizen of the United States, residing at Stamford, in the county of Fairfield and State of Connecticut, have invented new and useful Improvements in Spinning-Machines, of which the following is a specification.

The general object of the invention is to refine in point of a reduction of time, of floor area, of waste of material, and of expense by eliminating the steps involving the use of jack spools and the mule, the present method of manufacturing raw fibrous material into cops of yarn. And to this end the invention resides first in providing a combined spinning device, cop winder and automatic doffer, second, in connecting this apparatus with a card, and third, in arranging the parts so that the rovings from the condenser of the card will pass directly into the said combined spinning device, cop winder and automatic doffer so that there will be a continuous feed of material from the card to the cop.

Other objects will appear and be better understood from that embodiment of my invention of which the following is a specification, reference being had to the accompanying drawings forming part hereof, in which:—

Figs. 3ª and 3ᵇ are diagrammatic views illustrating the arrangement of the elements of the clutch devices when the parts are positioned as shown in Fig. 3.

Figs. 4ª and 4ᵇ are diagrammatic views illustrating the arrangement of the elements of the clutch devices when the parts are positioned as shown in Fig. 4.

Figs. 5ª and 5ᵇ are diagrammatic views illustrating the arrangement of the elements of the clutch devices when the parts are positioned as shown in Fig. 5.

Figure 1:
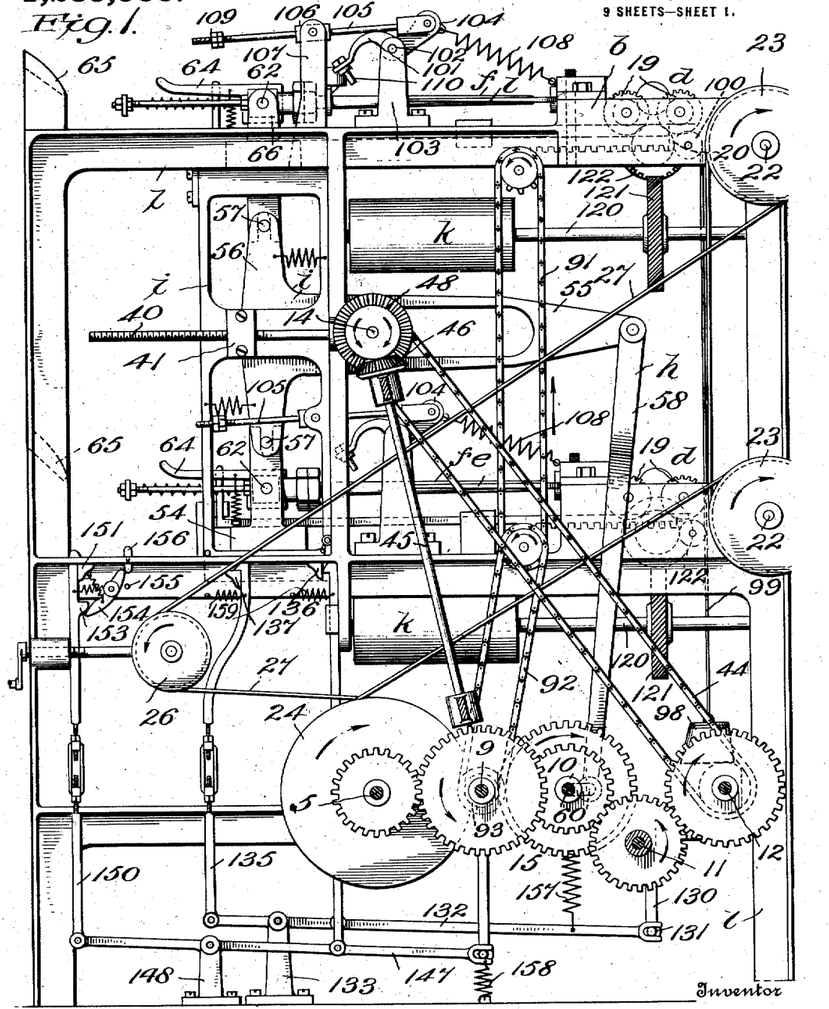
Figure 1 is a side elevation of the device partly in section.
Figure 2:
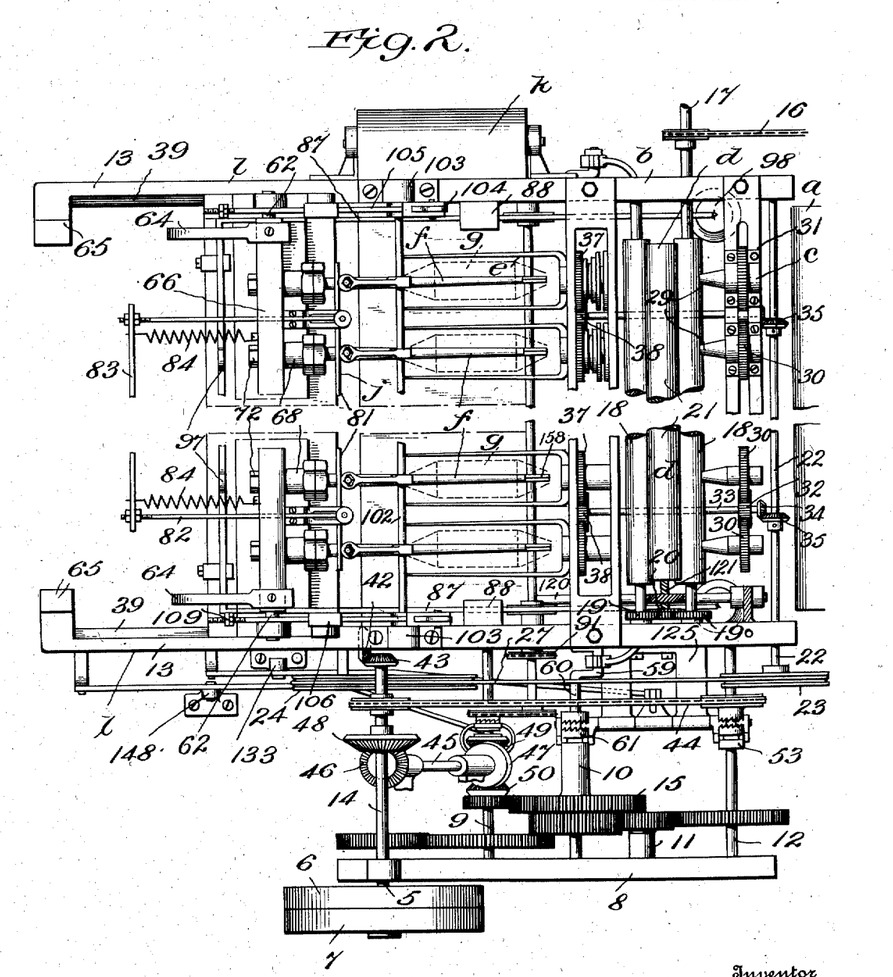
Fig. 2 is a contracted plan of the same.

In Figs. 1 and 2 *a* indicates a portion of the condenser of a finisher card and *b* a spinning apparatus. This spinning apparatus *b* is arranged in juxtaposition to the condenser *a* and includes an auxiliary condenser in the form of rotatable tubes *c* which impart a twist to the rovings passed therethrough from the condenser, whereby, to strengthen the rovings while drafting the same, a series of draft rolls *d* arranged for operating upon the rovings after these pass through the auxiliary condensers *c* and adapted for attenuating the rovings by operating to move these at a rate of speed greater than that at which they move from the condenser *a* to the auxiliary condensers $c$; a series of fliers $e$ which effect the winding and twisting of the yarn after the rovings are converted into such upon passing from the draft rolls $d$; spindles $f$ around which the cops $g$ are formed; a yarn guide $h$ which operates the yarn to wind with a zigzag motion; a carriage $i$ to which the spindles $f$ are attached and which feeds the spindles to the fliers; a doffer $j$ which operates to doff the cops after these are formed; and conveyers $k$—$k$ arranged for receiving the cops as these are doffed by the doffer $j$, and adapted for carrying the cops out of the spinning device.

The several parts just described of the spinning apparatus are carried by a frame $l$. In the embodiment shown this frame $l$ is proportioned so as to admit of mounting the several parts of the spinning apparatus with such relation to the upper and lower condensers that the rovings may be directed substantially horizontally into the spinning apparatus. The power is obtained from a main shaft 5, herein shown as adapted for belt connection by the presence of a pulley 6, with a suitable drive shaft, the main shaft also having thereon a loose pulley 7 for an obvious purpose. A lateral extension 8 of the frame $l$ as shown in Fig. 2, serves as a bearing for one end of the main shaft 5 and for a series of shafts 9—10—11 and 12, the opposite ends of all of which except shafts 10 and 11 are suitably mounted in the side 13 of the frame $l$. Disposed above the main shaft 5 and extending transversely of the frame $l$ and its extension 8, is a shaft 14. The shafts 5 to 12 inclusive, are connected by a reducing train of gearing 15, whereby the shaft 12 will operate at a lower rate of speed than the drive shaft 5. The shaft 10 is a hollow shaft or sleeve revoluble on a shaft 60, hereinafter described.

Inasmuch as the speed of the draft rolls $d$ must, in order to obtain a predetermined amount of draft, bear a required relation to the feed speed of the condenser $a$, I have herein shown a connection 16 which extends from a point (not shown) on the card to the shaft 17 of the draft roll mechanism and is adapted for transmitting rotary movement from its point of connection with the card to the draft roll mechanism, whereby any accidental variations in the speeds of the spinning apparatus and the card, will have no effect on the speed ratios of the card and draft roller device. It will, of course, be understood, however, that this arrangement is optional and may be substituted with a connection between the draft roll device and the main shaft 5. The rotating rolls 18—18 of the draft roll mechanism have gears 19—19 at one end, which mesh with the usual idler 20 and these rolls support the usual series of superimposed rolls 21.

Figure 10:
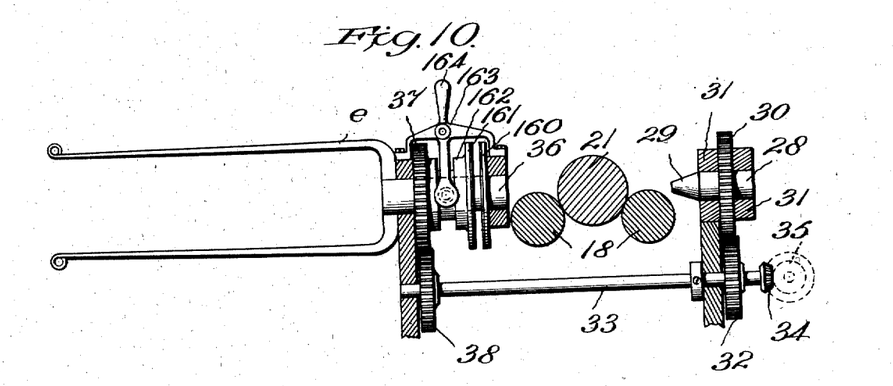
Fig. 10 is a detail partly in vertical cross section and side elevation of the draft, the spinning and the winding mechanisms.

The operating mechanism for the auxiliary condensers $c$ is herein shown to consist of shafts 22—22 for the upper and lower series of auxiliary condensers, groove pulleys 23—23 at one end of the shafts 22, a double groove pulley 24 on the main shaft 5, a belt tightener in the form of a pulley 26 and a belt in the form of a rope 27 trained as shown in Figs. 1 and 2, around the said pulleys. Each auxiliary condenser as shown in Fig. 10, includes a tube 28 with a tapered end portion 29 and arranged so as to function as the hub of a spur gear 30 through which the said tube extends, the said tube being journaled in suitable boxings 31—31 between which the spur gear 30 is disposed. As shown in Figs. 2 and 10, the several auxiliary condensers of each series are arranged in spaced relation and connection between the spur gears 30 and the shafts 22 is effected by means of pinions 32 which mesh with the spur gears of adjacent pairs of auxiliary condensers and which are mounted on shafts 33 having at one end bevel gears 34 which mesh with bevel gears 35 on the shafts 22.

The fliers $e$ have the usual hollow hubs 36 and these like the tubes 28, function as hubs for gear wheels 37. The fliers are arranged horizontally as shown and like the auxiliary condensers $c$ are connected in pairs by pinions 38 which mesh with the gear wheels 37 of adjacent fliers in each pair, these pinions being arranged on the shafts 33. Thus it will be seen that when the condenser $a$ and the main shaft 5 are in motion, the auxiliary condensers, draft rolls and fliers by virtue of their connections with the said main shaft and the said card, will also be in motion.

The carriage $i$ is mounted to reciprocate on guides 39—39 on the sides 13—13 of the frame $l$. The mechanism which operates the carriage has its speed so proportioned with respect to the speed of the winding and the feeding apparatus, that these latter will complete a cop during one reciprocation of the carriage.

In the embodiment shown this carriage operating mechanism is designed to operate the carriage at various speeds throughout one reciprocation of the same. This variation in speed of movement on the part of the carriage is required in forming the type of cop indicated by $g$ and is brought about by mechanism which preliminarily moves the carriage on its building motion or traverse toward the fliers at a relatively high rate of speed from doffing position to building position, then moves the carriage at a relatively low rate of speed during the remainder of such motion or traverse for the building or cop winding action, and finally retracts or moves the carriage at a relatively high rate of speed backward or away from the fliers on a reverse motion for purposes of doffing, the speed of the carriage being uniform throughout such doffing motion. In the embodiment shown this mechanism consists of screw-threaded shafts 40—40 confined against longitudinal movement in the frame 1 and extending through screw-threaded bushings in the sides of the carriage, one of these bushings being shown in Fig. 1 and indicated by 41. Bevel pinions 42 at the inner ends of the shafts 40 mesh with bevel pinions 43 on the shaft 14 and this shaft 14 is operatively connected as by a chain and sprocket construction 44 with the shaft 12 which, by virtue of the reducing train 15, turns at a lower rate of speed than does the main shaft 5. 45 indicates an obliquely disposed stub-shaft whose opposite ends are provided with bevel gears 46 and 47. The former of these meshes with a gear wheel 48 on the shaft 14 and the latter is positioned between bevel gear wheels 49 and 50 which are loose upon the shaft 9. The clutch collar 51, Fig. 11, arranged between the bevel gears 49 and 50 and splined upon the shaft 9, functions to effect the rotation of the stub-shaft 45 when in engagement with either of the bevel gears 49—50, but it will be observed that when the said clutch is in engagement with one of the bevel gears, as the bevel gear 49, the shaft will rotate in a direction opposite from what it would if the said clutch were in engagement with the bevel gear 50. Now by virtue of its position in the train 15, the shaft 9 will rotate faster than the shaft 12 and the bevel gears 48 to 50 inclusive, are proportioned so as to transmit to the shaft 14 a speed approximately the same as the shaft 9.

Figures 11, 12, 13:
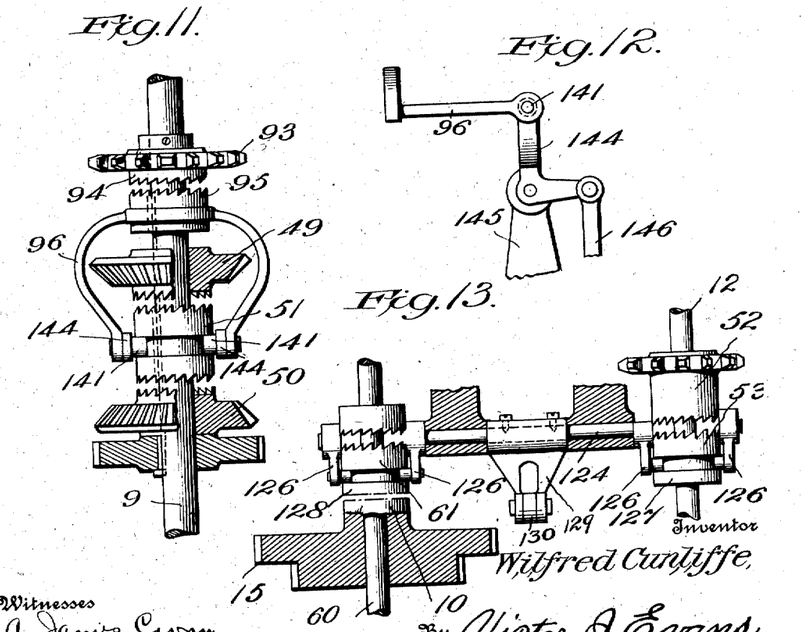
Fig. 11 is a detail plan partly in section of the clutch mechanism for controlling the speed of the downward movement and part of the inward movement of the carriage and also for controlling the mechanism that distends the doffing springs.
Fig. 12 is a detail side elevation of a part of the mechanism for actuating the clutch element.
Fig. 13 is a detail plan partly in section of the clutch mechanism for controlling the speed of the inward movement of the carriage and the operation of the reciprocating yarn guide.

Referring now to Figs. 2 and 13, the element 52 on the shaft 12 to which the chain 44 is connected, is loose on the said shaft and is adapted to coöperate with a clutch 53 on the said shaft 12. Thus it is obvious that when the element 52 is rendered active by the clutch 53 and the clutch collar 51 is in neutral position, as shown in Fig. 11, the carriage i will move inwardly at a relatively low rate of speed but when the said element 52 is passive as shown in Fig. 2, and the clutch 51 arranged in engagement with certain of the gear wheels 49—50, the carriage will move outwardly or recede from the fliers at a relatively high rate of speed.

Supports in the form of cross heads 54—54 mounted in suitable guides on the carriage i, are provided for the rock beam 66 which supports the spindles f. These cross heads are reciprocated by a walking beam 55 mounted on a transverse bar 55ª carried by carriage i. The arms 56—56 of walking beam 55 are connected to the opposed projecting ends of the cross heads by pin and slot connections 57—57. A link 58 connects the end of the walking beam with a crank 59 on a crank shaft 60 which extends through the tubular shaft 10 on the train 15. The shafts 10 and 60 are provided with the elements of a clutch 61 which, when active, effects the rotation of the shaft 60 and the operation of the walking beam 55 and the reciprocation of the cross heads 54. By virtue of its position in the train 15, the shaft 10 will, when operatively connected to the crank shaft 60, rotate the latter at a greater speed than the shaft 12 so that the spindles will be reciprocated a relatively great number of times during the inward movement of the carriage.

Trunnions 62—62 connect the rock beam 66 with the cross heads 54 and springs 63—63 yieldingly hold the spindles against tilting downwardly from the horizontal, upward tilting of the said spindles being positively prevented by the presence of stops (not shown). The upper ends of the springs 63 are connected to trip arms 64 at the opposite ends of the rock beam 66, and directed into the path of movement of these trip arms are cams in the form of inturned extensions 65—65 at the ends of the sides 13—13 of the frame 1. The relative positions of the trip arms and cams, are such as to effect the rocking of the beam 66 and the downward tilting of the spindles f when the carriage i is at the end of its outward movement.

Figure 14:
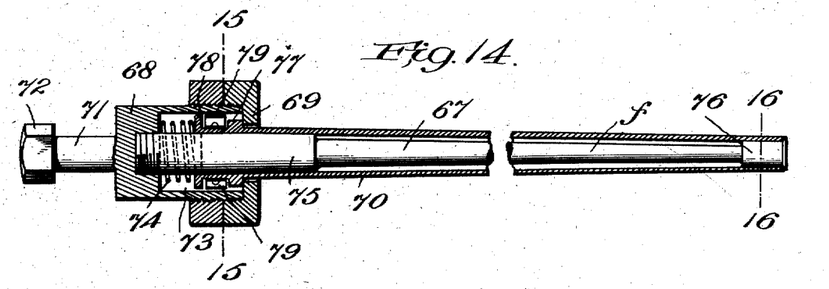
Fig. 14 is a contracted vertical longitudinal section of the spindle.
Figure 15:
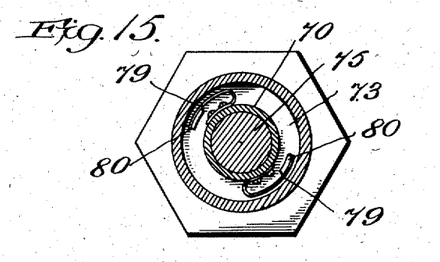
Fig. 15 is a vertical cross section on the line 15—15 of Fig. 14.
Figure 16:
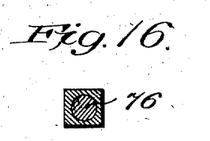
Fig. 16 is a vertical cross section on the line 16—16 of Fig. 14.

The spindles f are constructed to function as bobbins in the winding of the cop, whereby to eliminate the operation of covering the spindles with bobbins after the doffing of each set of cops. Referring now to Fig. 14 the spindle f comprises an inner core 67, a base 68, a retainer 69 and an outer casing 70. The base 68 has an end stud 71 which passes through the rock beam 66 and is secured by a nut 72. The said base 68 has a screw threaded socket in which is screwed the end of the core 67 and this base also has a chamber 73 which receives a compression spring 74 surrounding the inner end portion of the core 67. The casing 70 is rotatably mounted on the core 67 and the latter has enlargements 75 and 76 which keep the casing 70 centered. The cap 69 is adapted to be passed over the casing 70 and is further adapted to be screwed onto the base 68 and functions as a stop and retainer for the casing 70 by bearing on a circular shoulder 77 at the inner portion of the casing which is disposed in the chamber 73. A flange 78 on the casing 70 is arranged in spaced relation to the shoulder 77, and forms an abutment for one end of the spring 74 which spring operates to yieldingly hold the shoulder 77 in contact with the cap 69, whereby to prevent too free rotation of the casing 70 during the winding of the cop and thus obtain the drag required in the form of a speed variation between the casing and the flier, which is necessary to effect the forming of the cop. Arranged in the space between the shoulder 77 and flange 78 are the centrifugal spring governors 79—79. The free ends of these elements are provided with weights 80—80 which permit the governors to produce the required binding effect when they are moved by centrifugal force on to the wall of the chamber 73. With this construction it is obvious that the spring 74 and governors 79 function to produce the required variation in speed between the spindle and the flier, as does the gradually increasing weight of a cop being wound on an ordinary bobbin arranged vertically on a correspondingly positioned spindle and surrounded by a vertically disposed flier, it being manifest that with the present construction the drag produced on the spindle by the spring 74, is sufficient to retard the rotary movement of the spindle with respect to the flier until a considerable fraction of the cop in point of its thickness, is formed, but as the cop builds or fattens beyond this point and its peripheral speed tends to approximate the speed of the fliers, the governors moving into frictional contact with the wall of the chamber, produce the required retarding effect on the rotary motion of the spindle and this retarding effect increases in proportion to the tendency of the cop and spindle to rotate faster.

Figure 4:
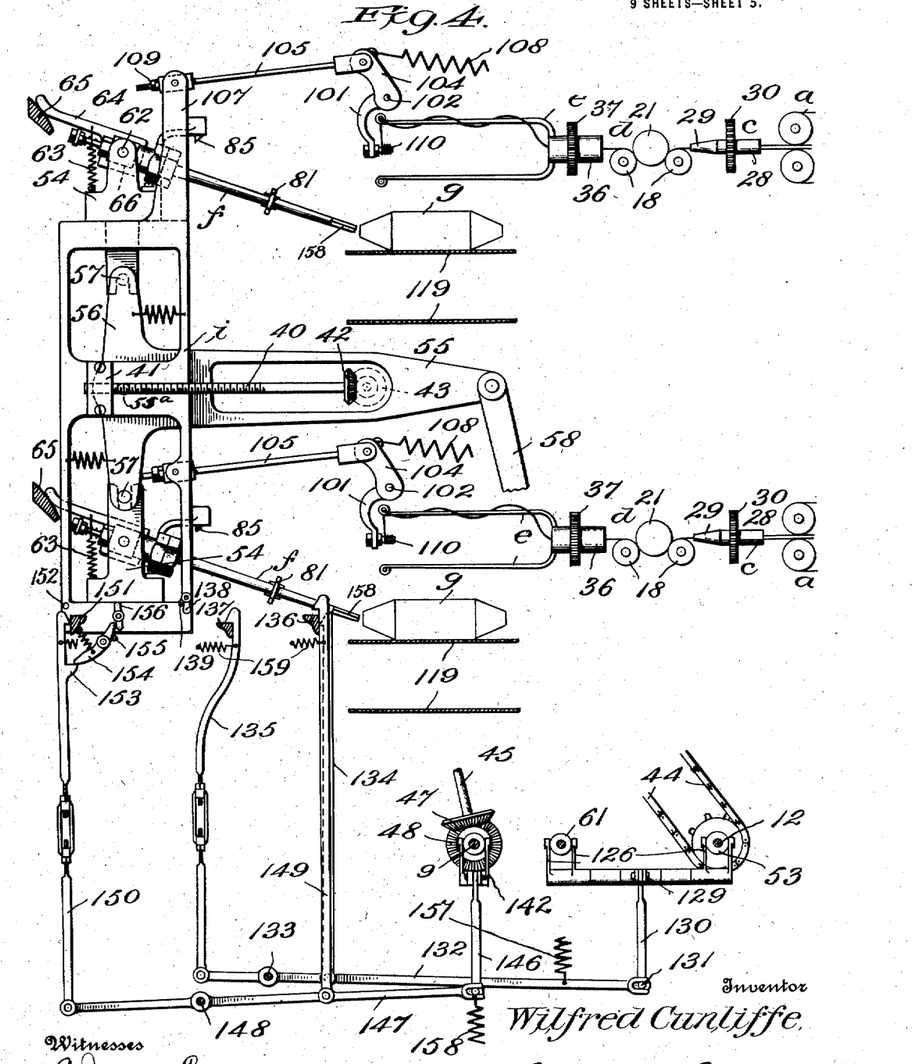
Fig. 4 is a view similar to Fig. 3 but showing the positions of the said parts at the time of doffing the cop.
Figures 4A, 4B:
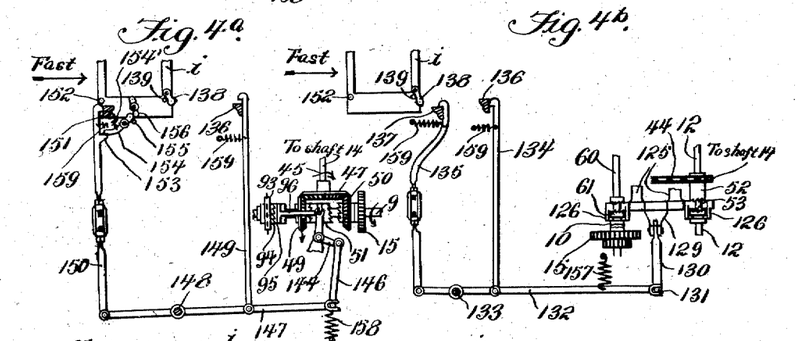
Figures 6, 7, 8, 9:
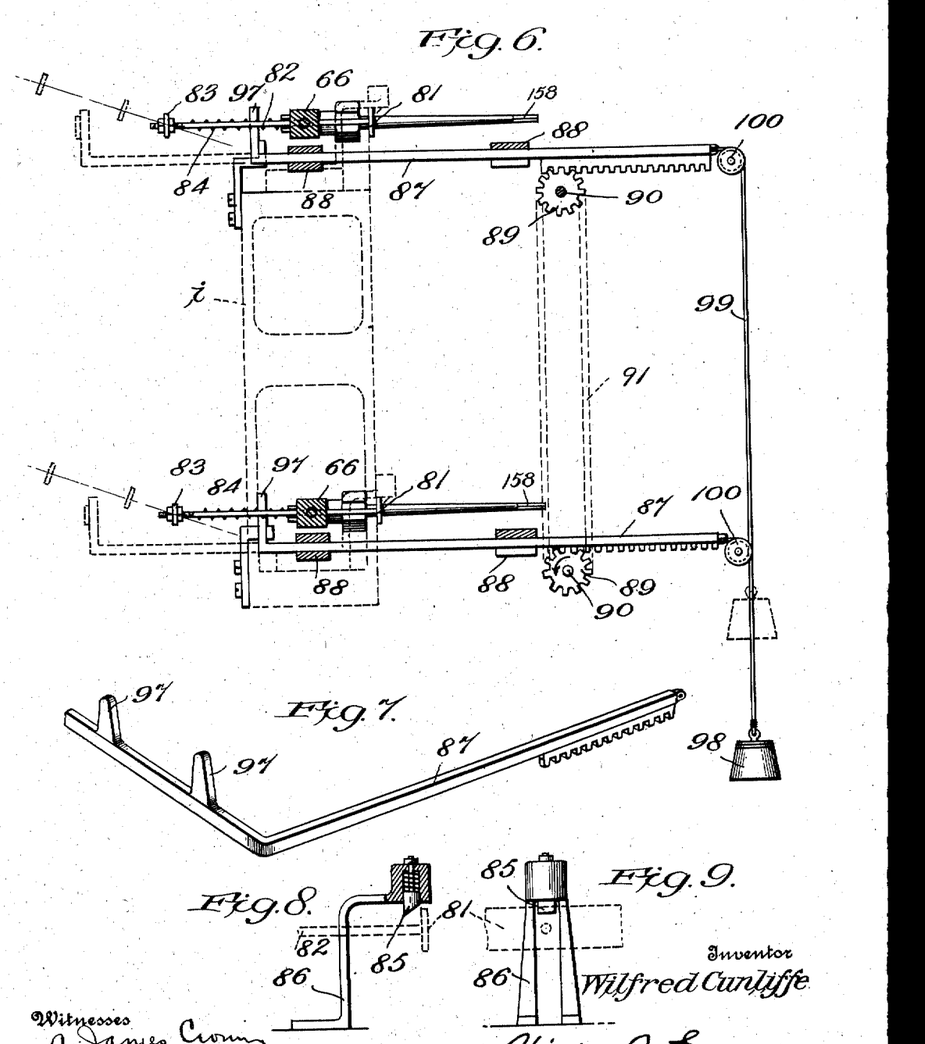
Fig. 6 is a detail vertical longitudinal section of the doffing mechanism.
Fig. 7 is a detail perspective of one of the setting elements of the doffing mechanism.
Fig. 8 is a detail side elevation partly in section showing one of the keepers of the doffing mechanism.
Fig. 9 is a detail front elevation of the structure shown in Fig. 8.

When the spindles are tilted at the end of the outward movement of the carriage as previously described, the cops are doffed or removed from the spindle by a doffer in the form of a plate 81. This plate has openings through which the spindles $f$ pass and the said plate is located normally adjacent to the cap portions of the spindles. As shown in Figs. 2 and 6, the plate is provided with rearwardly extending rods 82 which pass loosely through openings in the rock beam 66 and these rods have laterally extending end extensions 83 to which are connected the terminals of springs 84 which are connected to the rock beam 66 and which operate to project the plate to a point near the free end portion of the spindle, as shown in Fig. 4. The doffer plate 81 is normally held adjacent to the cap 69 and against the action of its springs by keepers in the form of spring-pressed latches 85 shown in detail in Figs. 8 and 9. These latches are mounted in vertically disposed angular-shaped brackets 86 connected to the carriage. The tilting of the spindles downwardly to the position shown in Fig. 4, moves the doffer plate downwardly and away from the keepers, whereupon the springs function to project the doffer plate. The doffer plates as shown in Fig. 6, are automatically set to the positions there shown, by the setting mechanism herein shown in the form of angular-shaped rack bars 87—87 arranged adjacent to the opposite sides of the frame $l$. These rack bars are slidingly mounted in guides 88 formed with the frame and are actuated to move in one direction by pinions 89—89 mounted on shafts 90—90 journaled in the frame and operatively connected together by a chain and sprocket construction 91, as shown in Fig. 1. The lower shaft 90 is operatively connected by a chain and sprocket construction 92 with a sprocket 93 loose on the shaft 9 of the train 15 and adapted to form the component 94 of a clutch, the other component 95 of which is connected to the clutch collar 51 by a yoke 96. When the spindle is raised to the horizontal from the position shown in Fig. 4, the bringing of the elements 94 and 95 of the clutch into engagement, effects the rotation of the pinions 89 and shafts 90. The moving of the rack bars 87 to the left in Fig. 6, brings the upstanding lugs 97—97 on the said rack bars into contact with the inturned end portions 83 of the rods 82 and continued rearward movement on the part of the said rack bars, moves the said rods rearwardly until the doffer plate engages with the latches 85. During this movement on the part of the rack bars 87, weights 98 suspended by flexible elements 99 from the rack bars and trained over pulleys 100, are raised so that when the clutch members 94 and 95 become disengaged, the weights will operate to restore the rack bars to their normal positions shown by full lines in Fig. 6.

Figure 17:
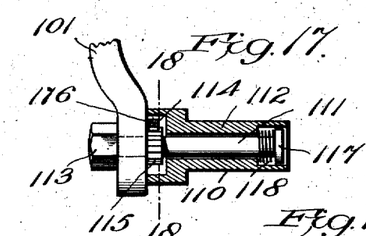
Fig. 17 is a sectional detail of the end winder.
Figure 18:
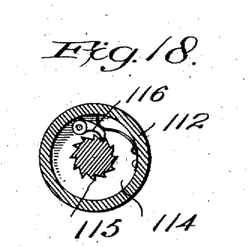
Fig. 18 is a vertical cross section on the line 18—18 of Fig. 17.

During the operation of tilting the spindles downwardly and doffing the cops, a series of end winders are projected into the spaces previously occupied by the free end portions of the spindles. These end winders each include an arm 101 fast to a shaft 102 extending transversely of the frame and journaled in uprights 103 arranged on opposite sides of the frame. The opposite end portions of the shaft 102 are provided with crank arms 104 to which are pivotally connected one end of rods 105 which are slidingly fitted in bushings 106 carried by uprights 107 attached to the carriage $i$. Springs 108 connected to the frame and cranks 104, operate to yieldingly hold the cranks in the position shown in Figs. 1 and 5. Adjustable heads in the form of nuts 109 are attached to the free end portions of the rods 105 and the relation which the operative lengths of these rods bear to the distance the carriage travels during its outward movement, is such that the bushings 106 will abut the heads 109 at approximately the same time as the elements 64 contact with the cam surfaces 65—65. This abutting of the heads 109 by the bushings 106 has the effect of pulling the rods 105 and rocking the shaft 102 against the action of the springs 108 on the cranks 104 and thus directing the spindles 110 at the ends of the arms 101, into the space between the arms of the flier. The spindles 110 are shown in sectional detail in Figs. 17 and 18. Here it will be observed that each spindle consists of a core 111 and a casing 112, the said core being fastened to the free end of the arm 101 by passing through an opening in the said arm and having a nut 113 screwed thereon. The casing 112 is rotatably mounted on the core 111 and is provided with a chamber 114 which chamber receives a ratchet wheel 115 secured to the core 111. A pawl 116 is mounted in the casing 114 and coöperates with the ratchet to prevent rotary movement of the casing in one direction. A head 117 is arranged at the free end of the core 111 and forms an abutment for one end of a compression spring 118 wound around the core and bearing at its other end on a circular shoulder in the casing 112. The presence of this spring 118 operates to produce a drag on the casing 112 during the winding of the yarn thereon by the flier.

Figure 19:
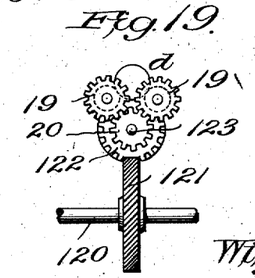
Fig. 19 is a detail side elevation of the conveyer operating mechanism.

When the cops are doffed in the manner previously described they are directed onto the conveyers $k$—$k$. These conveyers are herein shown in the form of flexible aprons 119 trained around drums and arranged so as to have their upper sides relatively near the ends of the spindles when these are tilted downwardly, as shown in Fig. 4. The said conveyers are also arranged transversely of the frame $b$ with one end of each conveyer extended beyond the frame, as shown in Fig. 2, and positioned so as to deliver the material conveyed thereby, into a box or receptacle arranged on the floor. The drums at one end of the conveyers are provided with shafts 120 which are extended beyond the drums at one end and provided with worm gear wheels 121 which mesh with worm gears 122 mounted on shafts 123, as shown in Figs. 2 and 19, these shafts 123 being turned by the idlers 20 which are keyed to the said shafts and which mesh with the gears 19—19 of the roller shafts, previously described.

The clutch mechanisms 53 and 61 which control the slow inward movement of the carriage and the guide or apparatus which controls the yarn to wind with a zigzag motion, are operated automatically by the carriage. As shown in Figs. 2 to 5 inclusive, and also in detail in Fig. 13, these clutch mechanisms include a shaft 124 mounted in the arms of a horizontally disposed yoke 125 connected to the frame 1. The ends of this shaft 124 are provided with angular-shaped fingers 126 which enter the grooves of the clutch collars 127—128 of the clutch mechanisms 53 and 61, respectively. A crank 129 fast on the shaft 124 and positioned between the arms of the yoke 125, has one end adapted for connection to a vertical link 130 one end of which is pivoted to the crank 129. The other end of this link is connected by pin and slot connections 131 to one end of a lever 132 which is fulcrumed on an upright 133, as shown in Fig. 1. Push rods 134 and 135 are connected at one end to the lever 132. These rods extend vertically upward and their upper ends are nosed to interlock with ledges 136 and 137 secured to the frame 1. The nosed portions of the push rods 134 and 135, extend into the path of a tripper 138 pivotally connected to the carriage $i$ and restrained against movement in one direction by a pin 139. The rod 134 is disposed between the fulcrum and the connected end of the lever 132, while the rod 135 is disposed at the free end of the said lever. With this construction, it is manifest that when the said rods are depressed successively by the tripper 138, the engaged end of the lever 132 will be successively raised and lowered, whereby the shaft 124 will be rocked and the clutch elements 53 and 61 thrown into and out of engagement.

The mechanism which transmits motion from the shaft 9 to the shaft 14 and which effects the moving of the carriage at a relatively high rate of speed, is operated automatically by the clutch mechanism, a portion of which is shown in detail in Fig. 11. This mechanism includes a yoke 96 the middle portion of which is secured to the clutch collar 95 and the terminals of which are provided with pins 141 arranged in the groove of the clutch collar 51. A bell crank 144 mounted on an upright 145, connects the yoke 96 with a link 146 connected to a lever 147 fulcrumed on an upright 148 as shown in Fig. 1. The lever 147 is provided with vertically disposed push rods 149 and 150. The former of these is disposed between the fulcrum and the engaged end of the lever 147 and has its upper end nosed and disposed so as to interlock with the ledge 136. The latter push rod 150 has its upper end nosed so as to engage with a ledge 151 similar to the ledges 136 and 137, the upper end of the said lever 150 being arranged so as to extend into the path of a stud 152 extending laterally from the carriage $i$. A toe 153 is arranged near the nosed upper end of the lever 150 and disposed so as to be operated by a latch 154 pivoted to the frame as shown in Fig. 1, and movable in one direction by a spring 154' and which is restrained against movement in such direction beyond the position shown in Fig. 4, by a pin 155 connected to the frame. 156 is an operating button pivotally connected to the frame 1 and arranged in the path of movement of the stud 152 of the carriage $i$.

With this construction it is obvious that when the carriage moves in one direction and the stud thereof engages with the nosed upper end of the push rod 150, the same will be disengaged from the ledge 151, whereupon the lever 147 and the clutch mechanism connected thereto will be operated. When the lever is depressed as just described, the toe 153 over-rides the latch 154, whereupon the latch prevents return movement of the presser bar until the carriage moves in the opposite direction and the stud 152 thereof by contacting with the button 156 turns the latter so as to turn the latch 154 from engagement with the toe 153.

Figure 5:
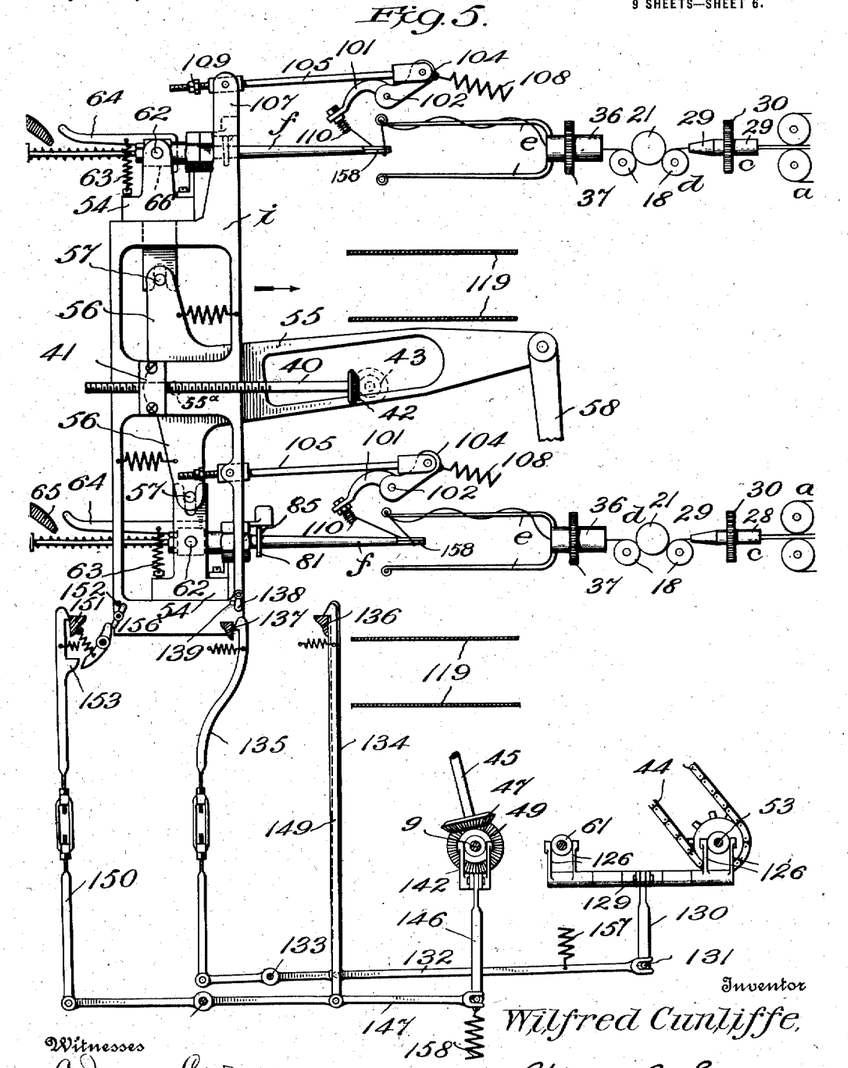
Fig. 5 is a view similar to Figs. 3 and 4 but showing the positions the said parts occupy at the time of beginning the cop.

In use the device operates as follows:

When the parts are positioned as shown in Fig. 5 the clutch elements 53 and 61 are thrown into engagement. At this time the carriage $i$ is progressing at the relatively low rate of speed to the right in Figs. 5, 5$^a$ and 5$^b$ and its forward end is between the ledges 136 and 137. The push rod 135 is disengaged from the ledge 137 and the elements of the clutch mechanisms yieldingly held against accidental displacement by the spring 157 connected to the lever 132 and to the frame. Here too it will be observed that the push rod 150 is disengaged from the ledge 151 and the nosed end portions of the push rods 134 and 149 are engaged with the ledge 136. The lever 147 to which the push rods 149 and 150 are connected, is, by virtue of the position of the push rod 149, held so as to maintain the clutch collars 95 and 51 in neutral positions, as shown in Figs. 5$^a$, 5$^b$ and 11. The spindles $f$ are now positioned horizontally and the end of the yarn directed around the ends of the said spindles. Here it will be observed that the end portions of the said spindles are non-cylindrical as indicated by 158, to insure against the turning of the yarn and the unwinding thereof from spindles 110 during the initial winding of the yarn around the spindles $f$.

Figure 3:
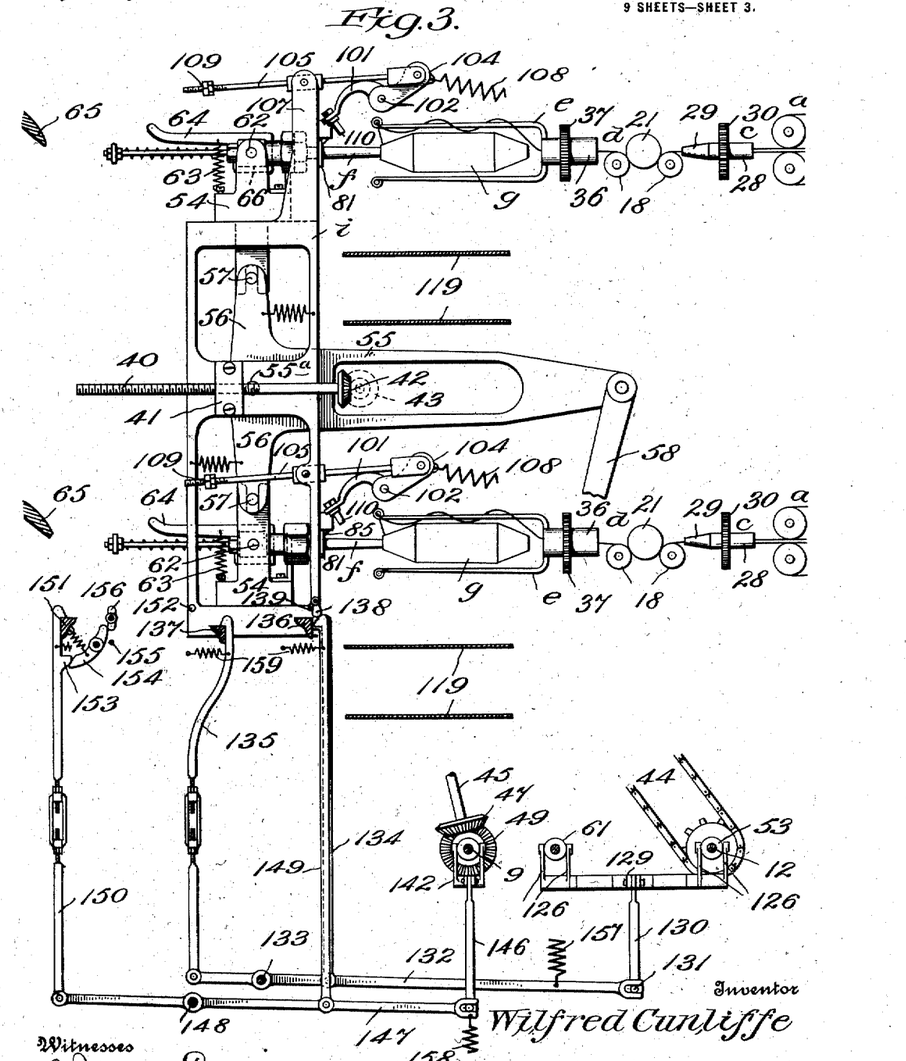
Fig. 3 is a sectional detail showing the positions which the cop winding parts occupy at the time of completing the cop.
Figures 3A, 3B:
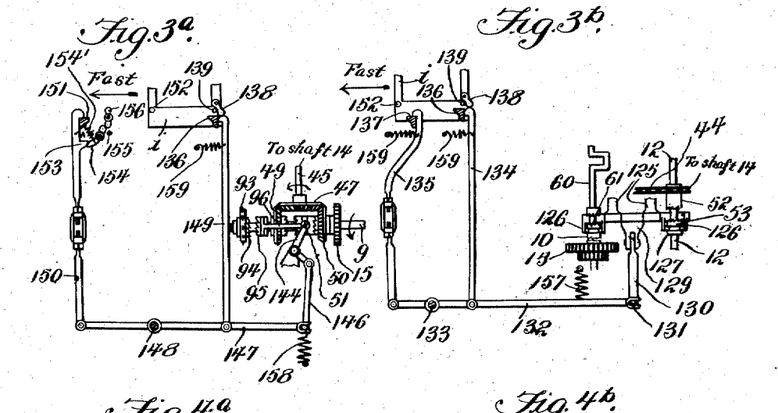

Movement on the part of the condenser, auxiliary condenser, draft rolls and flier mechanisms, effects the conversion of the rovings into yarn during the forming of the cops on the spindles $f$. It will be remembered that as the yarn is coiled around the spindles by the action of the fliers, the spindles are reciprocated by the guide mechanism $h$, whereby the yarn will be wound in a zigzag direction and inasmuch as the carriage is moving inwardly or forwardly this reciprocating movement on the part of the spindle, will combine with the movement of the carriage to form the cop with tapered or conical ends. This reciprocating motion of the spindle also, by effecting the winding of the yarn in a zigzag manner, causes the winds of the yarn to be interlocked and held closely together, forming a cop which is rigid and self-sustaining. The purpose of making such a cop is to adapt it to be employed without a bobbin within a shuttle, and to dispose one end of the yarn for the feed of the yarn, in weaving, from the center or inside of the cop, such a construction of cop allowing bobbins to be entirely dispensed with and a cop of greater size and containing a larger amount of yarn to be disposed for use within a shuttle. When the carriage reaches the limit of its forward or inward movement the tripper 138 as shown in Figs. 3, 3$^a$ and 3$^b$ will have disengaged the push rods 134 and 149 from the ledge 136 and depressed the same, rod 134 being depressed against the action of the spring 157. The spring 158 connected to the lever 147 operates to rock the said lever upon disengagement of the push rod 149 from the ledge 136, whereby to effect engagement of the nosed end portion of the push rod 150 with the ledge 151. The downward movement of the push rod 134 and that end portion of the lever 132 to which it is connected, raises push rod 135 and effects the elevation and engagement of said push rod 135 with the ledge 137. Thus at the end of the inward movement of the carriage the parts will occupy the positions shown in Figs. 3, 3$^a$ and 3$^b$ and this will have the effect of disengaging the elements of the clutches 53 and 61 and bringing into engagement the clutch collar 51 with the bevel gear wheel 50. The carriage will now be moved outwardly or backwardly at a relatively high rate of speed and until the elements 64 contact with the cams 65, whereupon the spindles will be tilted downwardly, thus disengaging the doffer plate from the latch bolts 85. The springs 84 will now operate to project the doffer plate thus effecting the stripping of the cops from the spindles, which latter will direct the cops onto the conveyer belt, as shown in Fig. 4. Now upon further rearward movement of the carriage the stud 152 will move into contact with the nosed upper end portion of the presser rod 150, thereby disengaging the said nosed portion from the ledge 151 and depressing the presser rod until the toe thereof is engaged and latched by the latch 154, as shown in Figs. 4, 4$^a$ and 4$^b$. This depressing of the presser rod 150 is carried on against the action of the spring 158 and the latch 154 prevents the presser rod from moving upwardly to the position shown in Fig. 5 when pressure by the stud is removed from the rod. In this action the latch is drawn upward by spring 154' and limited in motion by stop 155. This depressing of the rod 150 operates the clutch collars 51 and 95 to engage with the bevel gear wheel 49 and the sprocket wheel 93, respectively, and at the same time elevates the bar 149 so that its nosed end portion will over-ride the ledge 136. The effect had by shifting the position of the clutch collars will be the inward or forward preliminary moving of the carriage, for a certain distance, $i. e.$, up to the beginning of the building or cop winding point, at the same rate of speed as which it moved outwardly and at the same time the rack bars 87 will be moved relatively to the carriage, by virtue of the movement transmitted to the lower shaft 90 in Fig. 6 by the sprocket connections with the shaft 9. It will be understood that when the carriage moves forwardly and the elements 64 clear the cams 65, the spring 63 will restore the spindles to their normal horizontal positions and the movement on the part of the rack bars 87 relatively to the carriage, will bring the portions 97 of the rack bars into the path of movement of the laterally extending end portions 83 of the rods 82. Now this relative movement on the part of the carriage and the rack bars, will effect the tensioning of the springs 84 and the withdrawing of the doffer plate behind the latch bars 85 at which time the carriage will have advanced so as to bring the stud 152 as shown in Figs. 5, 5ª and 5ᵇ into contact with the button 156, thereby turning the said button and the latch 154 which operates to deflect the rod 150 until it clears the toe 153 thereof. Thus the parts will now again occupy the positions shown in Fig. 5 and the effect will be the returning of the clutch collars 51 and 95 to neutral position under the action of the spring 158, with the result that the carriage will be moved forward during the cop building or winding movement at a relatively low rate of speed.

Figures 5A, 5B:
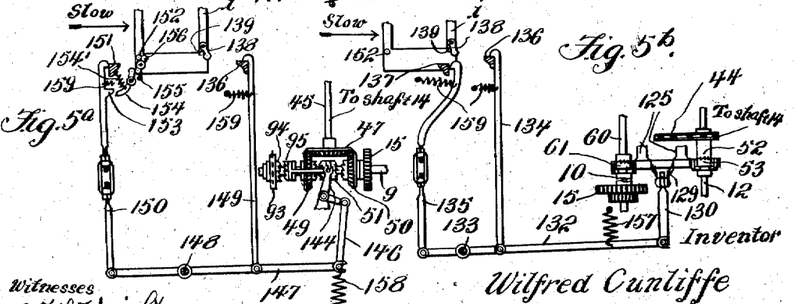

Referring now to Figs. 5, 5ª and 5ᵇ it will be observed that substantially simultaneously with the unlatching of the latch 154 the tripper 138 will have detached the nosed end portion of the rod 135 from the ledge 137, whereupon the spring 157 will coöperate with the pressure exerted by the tripper 138 on the rod 135 to move the elements of the clutches 53 and 61 into engagement with each other. Upon the unlatching of the latch 154 as just described and the upward movement of the rod 150 under the action of the spring 158 the rod 149 will descend until its nosed end portion interlocks with the ledge 136 and likewise upon disengagement of the nosed end portion of the rod 135, the corresponding end portion of the rod 134 will be elevated, whereupon the engaging end portions of the said rods 134 and 149 will interlock with the ledge 136, all of which is shown in Fig. 5. The rods 134, 135, 149 and 150 are moved when properly positioned to interlock with the several ledges by the springs 159.

The machine now begins the forming of a second series of cops as previously described. Here it will be observed and by referring to Figs. 3 to 5 inclusive, that when the carriage moves rearwardly and effects the tilting of the spindles $f$, the bushings 106 will abut the adjustable heads 109 on the rods 105, thereby rocking the end winders into the position shown in Fig. 4. As before stated, this positioning of the end winders will not take place until the cops have been lowered, in which position the ends will still be connected with the cops. However, upon the entering of the end winders into the fliers the ends will be coiled around the casings 112, whereupon the further lowering of the cops will have the effect of attenuating and finally rupturing the portion of the ends now connecting the cops with the end winders and this because of the fact that the pull exerted by the portions of the ends connecting the cops with the end winders, will tend to turn the casings 112 in a direction which is opposed by the pawl 116 and ratchet 115.

When the cops are doffed onto the conveyers as shown in Fig. 4, these operate to remove the cops as before stated to a receptacle located beyond the frame.

From the foregoing it will have been observed that the operation of forming the cops is continuous from the time the rovings leave the card. Moreover, the operation is entirely automatic and within the control of a minimum number of operators.

Referring now to Fig. 10 provision is made for stopping any flier in the event of the breaking of an end. This is effected by arranging the gear wheels 37 loose upon the hubs 36 of the fliers and arranging friction disks 160 on the hubs to coöperate with friction disks 161 connected to the gear wheels 37 by the sleeves 162, and providing a yoke 163 to support a lever 164 adapted for operating in the groove of the sleeve 162 to slide the disk 161 into and out of contact with the disk 160.

What is claimed as new is:

1. In a combined spinning and cop winding machine, the combination of a flier, a reciprocating carriage movable in reverse directions toward and from the flier for building and doffing motions, means for reciprocating the carriage and moving the same at relatively high and low rates of speed on its building motion, a support mounted on the carriage, a spindle carried by said support, and means for reciprocating said support and spindle during the period the carriage is moving at a relatively low rate of speed on its building motion.

2. In a combined spinning and cop winding machine, a flier, a reciprocating carriage, means for moving the carriage and adapted to vary the rate of speed of movement of the carriage toward the flier and adapted to move the carriage at a uniform rate of speed in a direction away from the flier, and a spindle carried by the carriage.

3. In a combined spinning and cop winding machine, the combination of a carriage, a support mounted on the carriage, a spindle carried by the support, means for reciprocating the support and moving the carriage, and means operated by the carriage for controlling the support and the carriage actuating means.

4. In a combined spinning and cop winding machine, the combination of a carriage, a support mounted on the carriage, a spindle carried by the support, means for reciprocating the support, and means for reciprocating the carriage, each of said last named means being operated successively by the carriage when the same moves in one direction.

5. In a combined spinning and cop winding machine, a flier, a carriage mounted for movement with relation to the flier, a spindle mounted upon the carriage, means for reciprocating the carriage and means carried by the carriage for actuating the carriage moving means and for causing the same to change its direction of movement.

6. In a combined spinning and cop winding machine, a flier, a carriage mounted for movement with relation to the flyer, a spindle carried by the carriage, means for moving the carriage and means carried by the carriage for actuating the carriage moving means for the same to move the carriage in different directions with relation to the flier, and also adapted to cause the carriage moving means to move the carriage in one direction at variable rates of speed.

7. In a combined spinning and cop winding machine, a flier, a carriage mounted for movement with relation to the flier, a spindle carried by the carriage, means for moving the carriage in two directions with relation to the flier, means carried by the carriage and adapted to actuate the operating means to cause the carriage to change its direction of movement with relation to the flier and adapted to actuate the carriage moving means whereby the carriage is moved at variable speed toward the flier and at a uniform rate of speed in a direction away from the flier.

8. In a combined spinning and cop winding machine, a flier, a carriage mounted for reciprocatory movement with relation to the flier, means for moving the carriage, a support pivotally mounted upon the carriage, a spindle carried by the support, means for tilting the support and spindle when the carriage moves in a direction away from the flier, and an end winder adapted to be moved by the carriage toward the flier when the carriage moves in a direction away from the flyer.

9. In a combined spinning and cop winding machine, a plurality of fliers, a carriage mounted for reciprocating movement with relation to the flier, supports carried by the carriage, spindles carried by the supports, means for reciprocating the carriage, means for tilting the supports and the spindles when in a direction away from the fliers, end winders, means for moving the end winders toward the fliers when the carriage moves in a direction away from the fliers, and means for advancing the spindles successively with relation to the carriage when the carriage initially moves toward the fliers.

10. In a combined spinning and cop winding machine, the combination of a flier, a builder carriage having a building motion in a direction toward and with relation to the flier and a reverse motion for doffing purposes in a direction away from the flier, a spindle carried by and movable with the carriage, and means for reciprocating the carriage, said means being operative to give the carriage a preliminary fast feed traverse and a relatively slower working traverse on its building motion and for moving said carriage on its doffing motion at an accelerated speed with respect to its working traverse.

11. In a combined spinning and cop winding machine, the combination of a flier, a carriage mounted for building and doffing motions in reverse directions with relation to the flier, a spindle carried by and movable with the carriage, means for operating the carriage, said means operating to impart a comparatively fast traverse and slower working traverse to the carriage on its building motion and a doffing motion of greater relative speed than said working traverse, and means for reciprocating the spindle on the working traverse of the carriage.

12. In a combined spinning and cop winding machine, the combination of a flier, a builder carriage movable in reverse directions with relation to the flier for building and doffing actions, a spindle supported by and movable with the carriage, means for operating the carriage and spindle, a member for engaging and holding the loose end of the thread carried by the flier between building motions of the spindle, and means for moving said member into and out of operative position on the doffing and building motions of the carriage.

13. In a combined spinning and cop winding machine, the combination of a flier, a carriage movable in reverse directions with relation to the flier for building and doffing actions, a spindle supported by and movable with the carriage, means for operating the carriage, means for tilting the spindle out of normal position on its doffing motion, and a doffer for removing the formed cop from the tilted spindle.

14. In a combined spinning and cop winding machine, the combination of a flier, a carriage mounted for building and doffing motions in reverse directions with relation to the flier, a spindle supported by and movable with the carriage, means for imparting building and doffing movements in reverse directions to the carriage and reciprocating the spindle on the building motion, means for moving the spindle at an angle from building to doffing position on the doffing motion, and a doffer operative in such position of the spindle to remove the formed cop therefrom.

15. In a combined spinning and cop winding machine, the combination of a flier, a carriage mounted for building and doffing motions in reverse directions with relation to the flier, a spindle supported by and movable with said carriage, means for imparting such motions to the carriage and reciprocating the spindle on the building motion, a thread engaging and holding device movable into and out of position to engage and release the end of the thread carried by the flier between operations of the spindle, and means for actuating said device.

16. In a combined spinning and cop winding machine, the combination of a flier, a builder carriage mounted for building and doffing motions in reverse directions with relation to the flier, a spindle supported by and movable with the carriage, said spindle being tiltable from a building to a doffing position, means for so moving the carriage and reciprocating the spindle on the building motion thereof, means for tilting and returning the spindle to normal position, a doffer operable to remove the formed cop from the tilted spindle, and a thread engaging device movable to engage the loose end of the thread carried by the flier between the building motions of the spindle.

In testimony whereof I affix my signature in presence of two witnesses.

WILFRED CUNLIFFE.

Witnesses:
ANTHONY CORVETTE,
GEORGE MORRELL.

It is hereby certified that Letters Patent No. 1,233,988, granted July 17, 1917, upon the application of Wilfred Cunliffe, of Stamford, Connecticut, for an improvement in "Spinning-Machines," were erroneously issued to Mianus Manufacturing Company, Inc. as sole owner of said invention, whereas said Letters Patent should have been issued to the *inventor, said Cunliffe, and Mianus Manufacturing Company, Inc., jointly*, said corporation being owner of *one-third* interest only in said invention, as shown by the records of assignments in this office; and that the said Letters Patent should be read with this correction therein that the same may conform to the record of the case in the Patent Office.

Signed and sealed this 14th day of August, A. D., 1917.

[SEAL.]

R. F. WHITEHEAD,
*Acting Commissioner of Patents.*

Cl. 118—51.